(12) United States Patent
Brodine

(10) Patent No.: US 6,888,462 B2
(45) Date of Patent: May 3, 2005

(54) SYSTEM AND METHOD FOR IDENTIFYING COMPONENT PARTS IN AN ASSEMBLY

(76) Inventor: Michael L. Brodine, 18 E. Elbon Rd., Parkside, PA (US) 19015

( * ) Notice: Subject to any disclaimer, the term of this patent is extended or adjusted under 35 U.S.C. 154(b) by 102 days.

(21) Appl. No.: 10/265,493

(22) Filed: Oct. 7, 2002

(65) Prior Publication Data

US 2004/0075559 A1 Apr. 22, 2004

(51) Int. Cl.$^7$ .............................................. G08B 13/14
(52) U.S. Cl. .............. 340/568.1; 340/10.1; 340/825.71; 340/572.1; 340/10.2
(58) Field of Search .......................... 340/568.1, 10.1, 340/5.1, 5.8, 825.36, 825.49, 825.71, 825.72, 10.3, 572.1, 572.7, 572.8, 10.2, 825.57, 10.4, 10.41; 342/42, 44, 457

(56) References Cited

U.S. PATENT DOCUMENTS

| | | | |
|---|---|---|---|
| 5,566,560 A | * | 10/1996 | LiCausi .......................... 70/18 |
| 5,661,473 A | * | 8/1997 | Paschal ................. 340/825.36 |
| 5,761,995 A | * | 6/1998 | Laiserin et al. ................ 101/32 |
| 5,982,894 A | * | 11/1999 | McCalley et al. .......... 340/5.21 |
| 5,991,673 A | * | 11/1999 | Koopman et al. ............. 701/32 |
| 6,317,026 B1 | | 11/2001 | Brodine ....................... 340/5.8 |
| 6,400,338 B1 | * | 6/2002 | Mejia et al. ................. 343/873 |

* cited by examiner

Primary Examiner—Jeffery Hofsass
Assistant Examiner—Daniel Previl
(74) Attorney, Agent, or Firm—LaMorte & Associates

(57) ABSTRACT

A system and method for identifying stolen component parts contained within an assembly and/or identifying the origin of a component part. To utilize the system, a passive integrated transponder is attached to at least some component parts within an assembly. Each of the passive integrated transponders transmits an identification code when activated. In a database, the identification codes of the passive integrated transponders are recorded along with the identification of the assembly into which they were originally installed. Assemblies in the marketplace are periodically scanned. As assemblies are scanned, the passive integrated transponders contained in those assemblies are activated and transmit their identification codes. The identification codes are read and compared to the data in a database. If a scan reveals a component part listed as stolen, an indication is provided.

15 Claims, 4 Drawing Sheets

SYSTEM AND METHOD FOR IDENTIFYING COMPONENT PARTS IN AN ASSEMBLY

BACKGROUND OF THE INVENTION

1. Field of the Invention

The present invention relates to devices and methods that are intended to identify the individual parts used in a larger assembly, such as a vehicle, thereby allowing those parts to be identified if stolen. More specifically, the present invention relates to identification systems where each component part of an assembly is encoded and can be electronically identified.

2. Description of the Prior Art

Every year thousands of cars, trucks and other vehicles are stolen. Many of those vehicles are taken apart and the individual parts are resold. The individual parts rarely contain vehicle identification numbers. Consequently, it is nearly impossible to determine if a used part came from a stolen vehicle or from a legitimate supplier.

Thieves also commonly break into vehicles and steal parts from those vehicles. For example, every year thousands of radios, air bags, wheels, seats and the like are stolen from vehicles. To combat such thefts, systems have been developed that provide an encoded identification number to electronic subassembly parts, such as radio and air bags. Such encoded electronic subassemblies transmit their encoded identification number to the main computer module of the vehicle. When the vehicle is being serviced and the main computer module is connected to a diagnostic computer, the encoded identification numbers of its subcomponents can be compared to identification numbers stored in a database of stolen parts. If a subcomponent is identified as being stolen part, authorities can be notified. Such prior art stolen article identification systems are exemplified by U.S. Pat. No. 6,317,026 to Brodine, entitled Vehicle Part Identification System And Method.

A problem associated with such prior art part identification systems is that they are only good for identifying electronic parts, such as air bags and radios that communicate with the main computer of the vehicle and are connected to the battery power of the vehicle. Such prior art identification systems are of no use in identifying non-electronic components such as wheels, fenders, seats and the like. Furthermore, such prior art identification systems cannot identify any part unless that part is installed in a vehicle. Thus, stolen parts that are on a store shelf or are in the junkyards of used part suppliers cannot be readily identified until after those parts are bought and installed.

A need therefore exists for a component part identification system that can be applied to all component parts that can be used to passively identify a stolen component part at any location. This need is met by the present invention as described and claimed below.

SUMMARY OF THE INVENTION

The present invention is a system and method for identifying stolen component parts contained within an assembly and/or identifying the origin of a component part. To utilize the present invention and system, a passive integrated transponder is attached to at least some component parts within an assembly. Each of the passive integrated transponders transmits an identification code when activated. In a database, the identification codes of the passive integrated transponders are recorded along with the identification of the assembly into which they were originally installed. If, at some point, an assembly is reported stolen, the identification codes for the component parts of that stolen assembly are marked in the database.

Assemblies in the marketplace are periodically scanned. As assemblies are scanned, the passive integrated transponders contained in those assemblies are activated and transmit their identification codes. The identification codes are read and compared to the data in a database. If a scan reveals a component part listed as stolen, an indication is provided.

BRIEF DESCRIPTION OF THE DRAWINGS

For a better understanding of the present invention, reference is made to the following description of exemplary embodiments thereof, considered in conjunction with the accompanying drawings, in which.

DETAILED DESCRIPTION OF THE INVENTION

Although the present invention device can be used to protect any component part of an assembly, such as the component parts of computers, farm equipment and the like, the present invention device is particularly well adapted for use in identifying the component parts of a vehicle. As a result, the present invention system will be primarily described in an application for protecting the component parts of a vehicle in order to set forth the best mode contemplated for the system.

A vehicle has thousands of component parts that are contained in hundreds of subassemblies. Many of these component parts and/or subassemblies are commonly stolen from vehicles or stripped from stolen vehicles and resold on the used part market. Such component parts and subassemblies, include, body trim, body panels, doors, wheels, radios, and a wide array of engine and drive train parts. A majority of such subcomponents do not contain internal circuitry and are not directly coupled to the battery of vehicle when installed on the vehicle.

Figure 1:
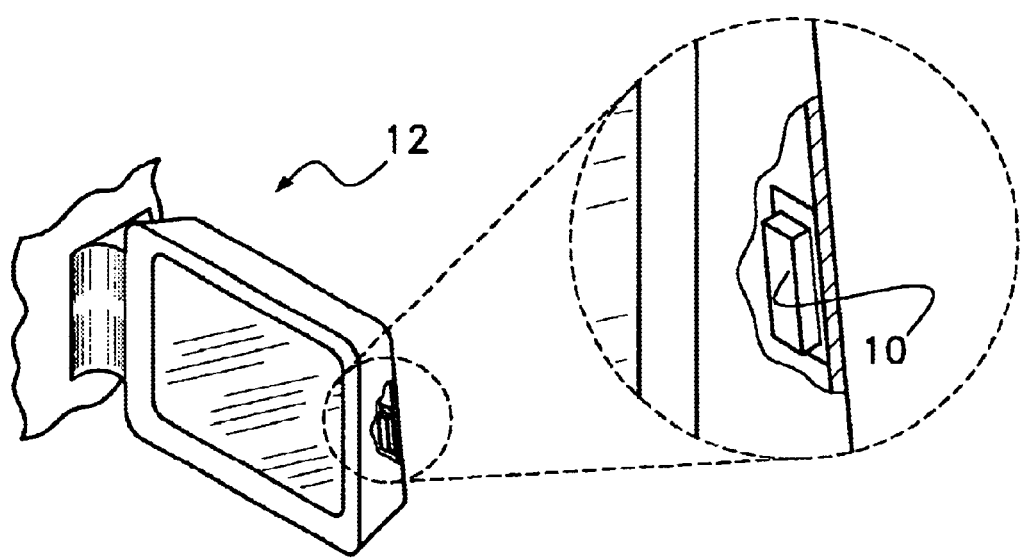
FIG. 1 is a partially fragmented perspective view of a component part containing the present invention identification system.

Referring to FIG. 1, a side mirror assembly 12 is illustrated. Within the structure of the mirror assembly 12 is placed a passive integrated transponder 10. Passive integrated transponders 10 are electronic devices that can transmit a ten to fifteen digit alphanumeric identification code when activated. Currently, miniature passive integrated transponders 10 have a length of between twelve and twenty-eight millimeters and a diameter of between two and four millimeters, depending upon the transmission strength and sensitivity of the passive integrated transponder 10. This provides the smaller passive integrated transponders 10 with a size no greater than that of grains of rice. The passive integrated transponder 10 can be either placed in a bore or adhesively attached to an internal component of the side-mirror assembly 12 at any point that can accommodate the device of such a small size. Most every component of a vehicle has enough unused internal space to receive a passive integrated transponder 10 at some point.

Passive integrated transponders 10 are housed in a protective casing that isolates the electronics of the passive integrated transponder 10 and therefore allows the passive integrated transponder 10 to function in wet environments, oily environments or any other environment found in or around a vehicle.

Passive integrated transponders 10 have no batteries. Rather, they are activated passively. In each passive integrated transponder 10 is a coil. When the coil passes a properly calibrated electro-magnetic field, a current is induced in the coil that is sufficient to activate the passive integrated transponder 10 and transmit the identification code.

The structure of passive integrated transponders is described in U.S. Pat. No. 6,400,338 to Mejia, entitled, Passive Integrated Transponder Tag With Unitary Antenna Core, the disclosure of which is incorporated into this specification by reference.

Figure 2:
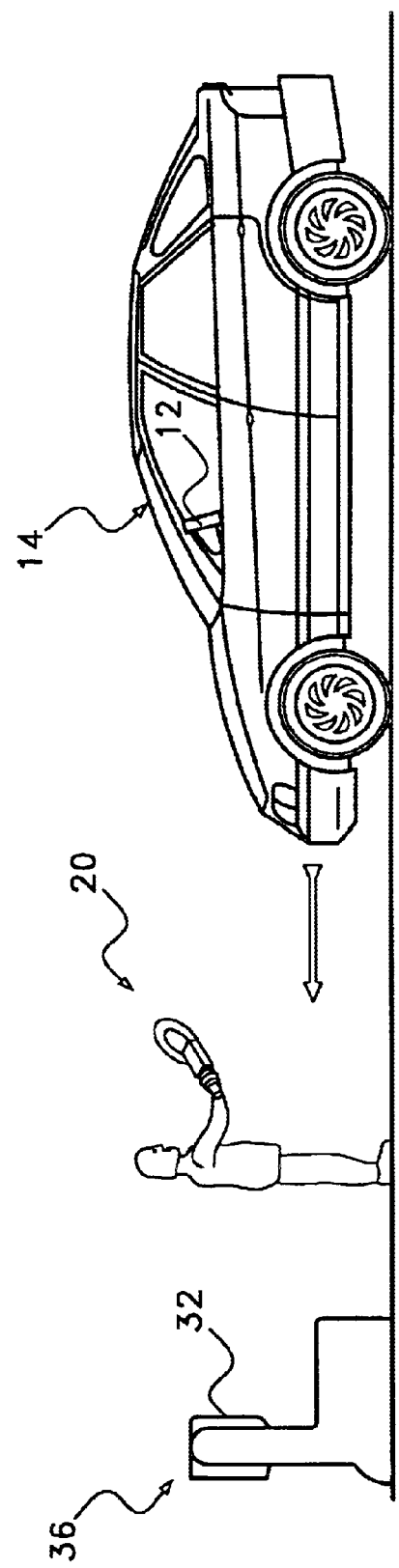
FIG. 2 shows a vehicle containing the present invention system passing through two types of scanning procedures.

Referring to FIG. 2, it can be seen that the properly calibrated electromagnetic force needed to activate the passive integrated transponder can be generated in two ways. First, a handheld scanner 20 can be passed over any selected component of the vehicle 14. The handheld scanner 20 produces the electromagnetic field needed to activate the passive integrated transponder. As the scanner passes over a passive integrated transponder within the vehicle 14, that transponder is activated and transmits its identification code. The scanner 20 then reads the identification code that is transmitted.

Alternatively, a calibrated electromagnetic field can be generated at a toll booth, police check point, tunnel entrance or other confined space 30. As the vehicle 14 passes through the confined space 30, the vehicle 14 passes through the electromagnetic field and every passive integrated transponder contained within that vehicle 14 is activated. The identification codes from all the activated passive integrated transponders are then read by receivers 32 that pass close to the vehicle.

Although each passive integrated transponder can be manufactured to transmit its own unique identification code, a group of passive integrated transponders can be manufactured to transmit the same identification code.

Figure 3:
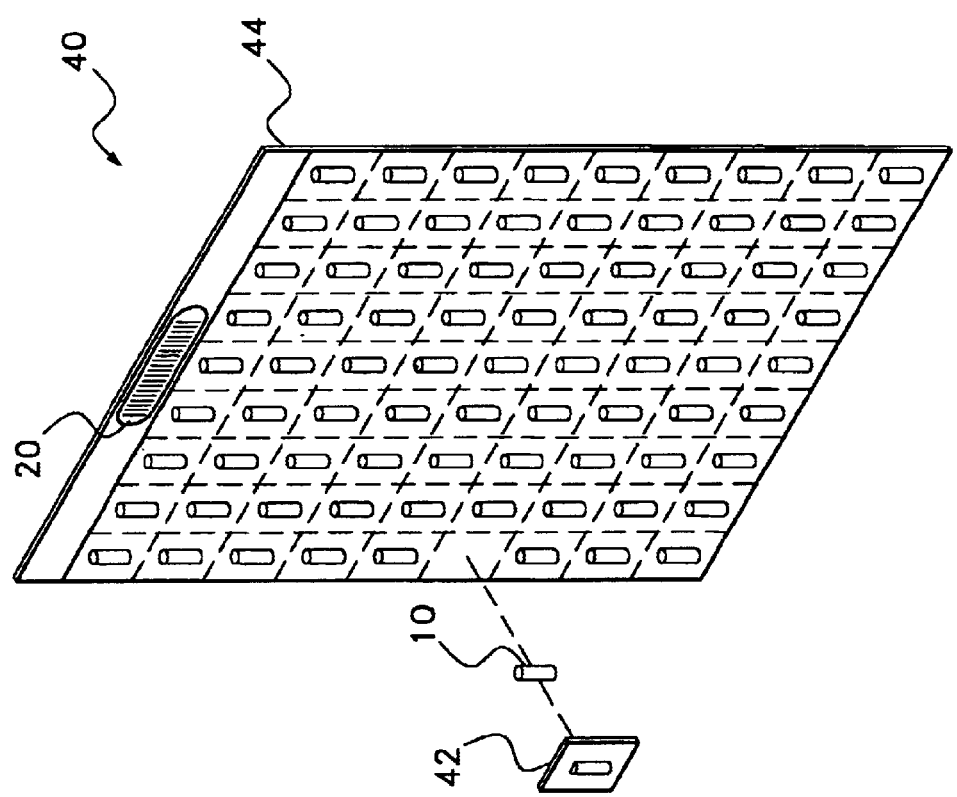
FIG. 3 is a perspective view of a pack of matched passive integrated transponders with application tape.

Referring to FIG. 3, a set 40 of passive integrated transponders 10 is shown. The passive integrated transponders 10 are set into a small segment of adhesive tape 42. Each segment of adhesive tape 42 is attached to a pack sheet 44, wherein one segment of tape 42 and passive integrated transponder 10 can be peeled away from the pack sheet 44 when desired. The pack sheet 44 is identified with a bar code or some other indicia 46 that is indicative of the identification code that will be transmitted by the passive integrated transponders 10 in the set 40.

In a manufacturing environment that uses modern assembly line production, it is difficult to predict which subcomponents will be assembled together. As such, it would provide a logistics problem to insert a particular passive integrated transponder into a subcomponent as that subcomponent is being manufactured. By using the pack sheet 44 of FIG. 3, the pack sheet 44 can be attached to a product at the beginning of the assembly line. As different subassemblies are added to the product along the length of the assembly line, different passive integrated transponders 10 can be removed from the pack sheet 44 and added to the subassemblies. At the end of the assembly line, the final assembly will have its subcomponents all containing passive integrated transponders 10 that transmit the same identification code when activated.

When applied to an automobile, it will be understood that a set 40 of passive integrated transponders 10 can be manufactured that transmit the vehicle identification code for that automobile when activated. The passive integrated transponders 10 are added to the valuable parts of the automobile as the automobile is being assembled. Thus, parts such as the fenders, body panels hood, seats, mirrors and the like can all contain passive integrated transponders 10 that transmit the vehicle identification code of the vehicle in which they where first assembled.

Figure 4:
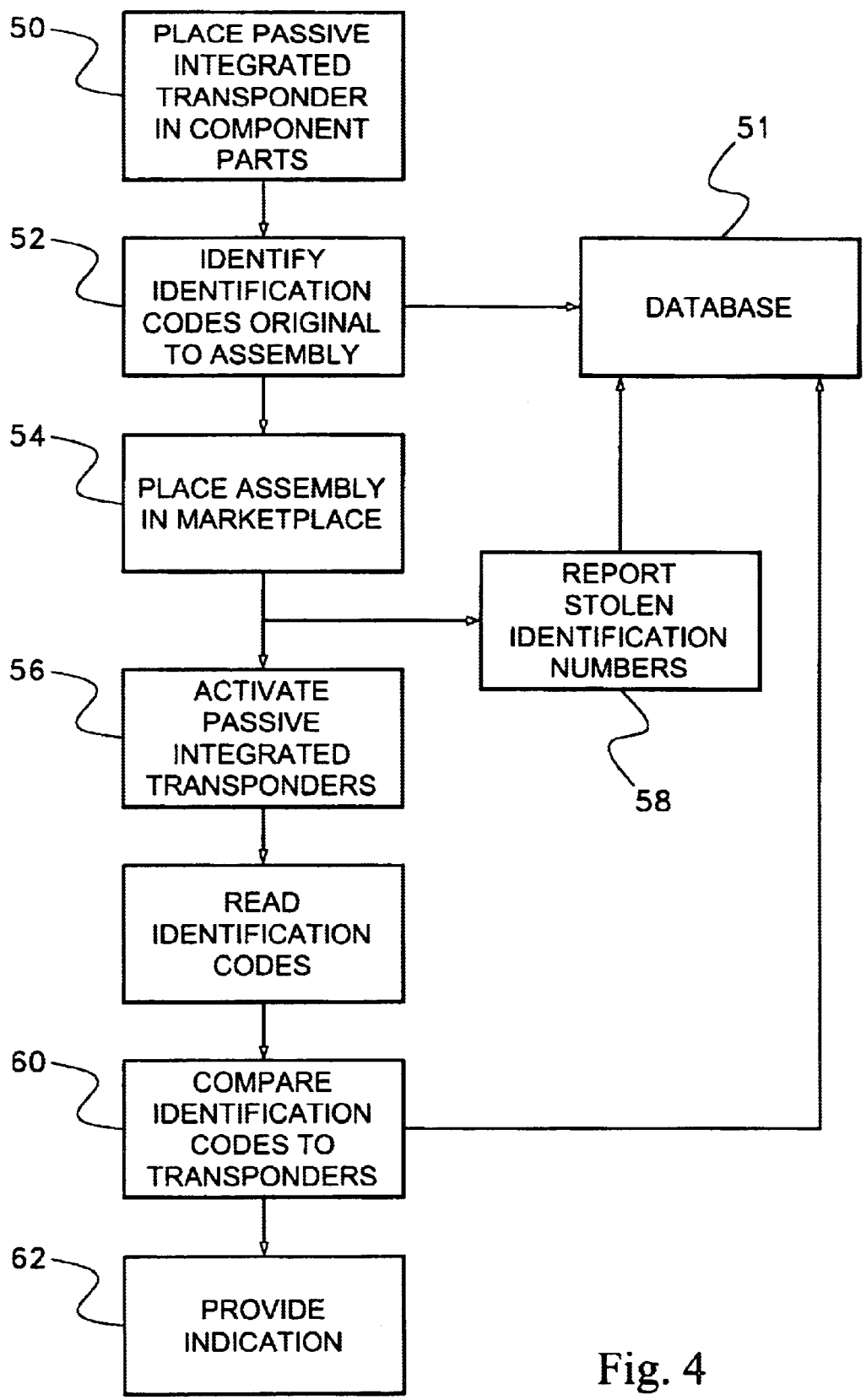
FIG. 4 is a block diagram schematic illustrating a method of operation in accordance with the present invention.

With this process in mind, the method of FIG. 4 can now be described. Referring to FIG. 4, in Block 50, it can be seen that passive integrated transponders are added to the component parts of a larger assembly. The larger assembly can be a vehicle, a computer system or any other assembly of value. The passive integrated transponders can each transmit either a common identification code or unique identification codes.

Referring to Block 52, it can be seen that the identification codes of the passive integrated transponders of an assembly are recorded in a database 51. If the identification codes of the passive integrated transponders all match, only one identification code need be recorded. If passive integrated transponders with different identification codes are used in the assembly, each passive integrated transponder in the assembly is activated and the transmitted identification numbers are recorded in the database 51 as being associated with that assembly.

As is indicated by Block 54, once the identification code or codes that are associated with the passive integrated transponders of an assembly are recorded in the database 51, the assembly is placed into the marketplace.

In the marketplace, the assembly may be sold, resold, repaired and the like throughout the useful life of that product. Scanners are used to periodically scan products and parts in the marketplace. As is indicated by Block 56, when the assembly or parts of the assembly are scanned, the passive integrated transponders are activated. If the assembly is a vehicle, scans can be performed at toll booths, tunnels, police check points and the like, as the vehicle drives through such points. For other assemblies, such as car parts, computers and the like, scans can be made by store owners, repair shops and other retailers using portable scanning equipment.

As is indicated by Block 58, if an assembly or component part of an assembly is stolen while in the marketplace, the victimized owner can report the theft to authorities. The identification code or codes for the stolen assembly or component are identified as being stolen in the database 51.

As assemblies and components are scanned in the marketplace, the identification codes read after each scan are checked against the information contained in the database 51. See Block 60. If a read identification code matches that of a stolen assembly or component, an indication is provided that tells the person or authority taking the scan that stolen property is present. See Block 62.

In a practical application of the method of FIG. 4, assume that the part of a stolen car containing a passive integrated transponder is sold as a used part. That stolen part is then used to repair a damaged automobile. As the repaired automobile passes through a toll both or is scanned at a state inspection site, the scanner would reads the presence of the stolen part. Authorities can then investigate the matter and would have a direct link to the source of the stolen part.

Once repair shops realize that stolen parts can be traced back to them, there will be a great incentive to stop using stolen parts. The market for stolen cars and stolen parts will then cease to exist.

In another application of the present invention system and method, assume there is a hit and run accident. Left behind at the scene of the accident is the passenger side mirror assembly of the hit and run vehicle. Utilizing the present invention system, police can now rapidly identify the exact vehicle from which that side mirror assembly came by scanning the passive integrated transponder that is located in the side mirror assembly.

It will be understood that the embodiment of the present invention described and illustrated herein is merely exemplary and a person skilled in the art can make many variations to the embodiment shown without departing from the scope of the present invention. All such variations, modifications and alternate embodiments are intended to be included within the scope of the present invention as defined by the appended claims.

What is claimed is:

1. A method of identifying stolen component parts contained within an assembly, said method comprising the steps of:

attaching passive integrated transponders to at least some component parts in an assembly, said passive integrated transponders being independent electronic assemblies that are electronically isolated from said component parts, wherein each of said passive integrated transponders transmits an identification code when activated;

providing a database;

recording the identification codes of the passive integrated transponders for different component parts in said database;

indicating in said database which identification codes belong to stolen component parts, as component parts are reported stolen;

scanning assemblies with an external scanning system, thereby activating said passive integrated transponders in said component parts of said assemblies and reading identification codes transmitted by said passive integrated transponders;

comparing said identification codes read during scanning to said database; and providing an indication if an identification code read during scanning matches an identification code of a stolen component part.

2. The method according to claim 1, wherein said assembly is a vehicle and said step of scanning occurs during a periodic state inspection of said vehicle.

3. The method according to claim 1, wherein said assembly is a vehicle and said step of scanning occurs during said vehicle being driven through a check point.

4. The method according to claim 1, wherein said passive integrated transponders in said at least some component parts of an assembly transmit a common identification code when activated.

5. The method according to claim 4, wherein said assembly is a vehicle having a vehicle identification number and said common identification code corresponds to said vehicle identification number.

6. A method of identifying an origin of a component part in an assembly, comprising the steps of:

attaching passive integrated transponders to at least some component parts in an assembly, said passive integrated transponders being independent electronic assemblies that are electronically isolated from said component parts, wherein each of said passive integrated transponders transmits an identification code when activated;

providing a database;

recording the identification codes of the passive integrated transponders of different component parts in said database;

scanning a component part of a questionable origin that contains a passive integrated transponder, therein activating said passive integrated transponder in said component part and reading the identification code transmitted by said passive integrated transponder; and comparing the identification code read during scanning to said database to identify an origin of said component part.

7. The method according to claim 6, wherein said assembly is a vehicle and said step of scanning a component part occurs during a periodic state inspection of said vehicle.

8. The method according to claim 6, wherein said assembly is a vehicle and said step of scanning a component part occurs during said vehicle being driven through a check point.

9. The method according to claim 6, wherein said assembly contains multiple component parts with passive integrated transponders, wherein said passive integrated transponders transmit a common identification code when activated.

10. The method according to claim 9, wherein said assembly is a vehicle having a vehicle identification number and said common identification code corresponds to said vehicle identification number.

11. The method according to claim 6, further including the step of indicating in said database identification codes that correspond to component parts that are reported stolen.

12. The method according to claim 11, further including the step of providing an indication after a scan if the identification code transmitted by a passive integrated transponder corresponds to an identification code of a stolen component part in said database.

13. A vehicle comprised of component parts, wherein at least some of said component parts contain passive integrated transponders that transmit an identification code when activated, wherein said passive integrated transponders are independent electronic assemblies that are electronically isolated from said component parts.

14. The vehicle according to claim 13, wherein all said passive integrated transponders in said vehicle transmit a common identification code when activated.

15. The vehicle according to claim 14, wherein said vehicle has a vehicle identification code and said common identification code corresponds to said vehicle identification code.

* * * * *